(12) United States Patent
Baxter

(10) Patent No.: US 7,504,636 B1
(45) Date of Patent: Mar. 17, 2009

(54) RADIATION DETECTOR USING PULSE STRETCHER

(75) Inventor: Larry K. Baxter, Gloucester, MA (US)

(73) Assignee: XRF Corporation, Somerville, MA (US)

( * ) Notice: Subject to any disclaimer, the term of this patent is extended or adjusted under 35 U.S.C. 154(b) by 0 days.

(21) Appl. No.: 11/613,739

(22) Filed: Dec. 20, 2006

(51) Int. Cl.
*G01T 1/17* (2006.01)
(52) U.S. Cl. .................................. 250/370.07
(58) Field of Classification Search ............. 250/370.07
See application file for complete search history.

(56) References Cited

U.S. PATENT DOCUMENTS

| | | | |
|---|---|---|---|
| 2,968,726 A | 1/1961 | Bersin et al. | |
| 3,569,996 A | 3/1971 | Goell et al. | |
| 3,681,601 A | 8/1972 | Paap et al. | |
| 4,255,659 A | 3/1981 | Kaufman et al. | |
| 4,460,830 A * | 7/1984 | Allemand et al. | 250/370.07 |
| 5,340,990 A * | 8/1994 | Brackenbush et al. | 250/395 |
| 2004/0129888 A1* | 7/2004 | Kannan et al. | 250/370.07 |

FOREIGN PATENT DOCUMENTS

JP 03197893 A * 8/1991

* cited by examiner

*Primary Examiner*—Constantine Hannaher
(74) *Attorney, Agent, or Firm*—George A. Herbster

(57) ABSTRACT

A radiation detection apparatus for use in noisy environments in which radiation detection and external noise generate interaction event pulses. A first interaction pulse initiates a following time interval during which the effect of received interaction event pulses is minimized. For example, the interaction event pulses produced by noise are not counted if they occur during the time interval.

20 Claims, 7 Drawing Sheets

RADIATION DETECTOR USING PULSE STRETCHER

BACKGROUND OF THE INVENTION

1. Field of the Invention

This invention generally relates to radiation detectors for monitoring the presence of radioactivity and particularly to a detector useful in monitoring radioactivity in a noisy environment.

2. Description of Related Art

A variety of radiation detectors have been developed for monitoring the presence of radioactive substances in commercial, laboratory and medical facilities. In these environments trained personnel handle radioactive substances and risk radiation exposure.

The standard for monitoring radiation is to determine any received dose in "rems." A rem (radiation equivalent man) is related to a "rad" (radiation absorbed dose) based upon the nature and energy of the radioactivity. For gamma and beta radiation, one rad translates to one rem. For alpha radiation one rad translates to twenty rem; one rad of neutron radiation, to between five and twenty rem depending upon neutron energy. It is important to evaluate any radiation exposure in terms of rems because it is the most relevant measure of the biological effect of radiation exposure.

In many instances personnel in such environments wear radiation badges or carry pagers that monitor the absorbed dose in rem. In addition or as an alternative, trained personnel use Geiger counters. Geiger counters use a gas tube radiation detector and emit clicks when high energy radioactive particles are detected. However, Geiger counters are not sensitive to very low levels of radiation and have no ability to distinguish the energy of a particle that causes a click. Geiger counters typically provide an indication of radiation exposure in rads, not rems.

U.S. Pat. No. 2,968,726 (1961) to Bersin et al. discloses a radiation measuring instrument for measuring the effects of neutron radiation to 10 Mev and gamma radiation. A circuit including an ion chamber and amplifier determine the effects of the gamma and low energy neutron radiation, e.g., less than 250 Kev. A methane counter, pulse amplifier and discriminator produce pulses that contain information about all neutron energies above the 250 Kev. In order to maintain linear operation of the circuitry, Bersin et al. incorporate a pulse stretcher to attenuate incoming pulses and offset the attenuation by stretching the pulse width. An amplifier combines the processed outputs of the ion chamber and the methane counter to obtain rem values.

FIG. 1 is a simplified block diagram that depicts another example of a radiation detection apparatus that generates rem readings. This is an XRF ICS-400 spectrometer available from the assignee of this invention. Specifically this radiation detection apparatus 10 includes a detector 11 that generates an output pulse for each interaction with a radioactive particle, i.e., an "interaction event." The detector 11 can comprise a scintillating crystal that generates a light pulse, or "flash" in response to each interaction event. A photodiode or photomultiplier detector circuit 11 converts each light pulse into an electrical pulse, $V_{in}$. Alternatively crystals of cadmium telluride or similar materials can be substituted to convert radioactive particles directly into current if biased with a dc voltage.

In whatever form, each pulse is a low level signal with only a few thousand electrons and an amplitude that varies as the energy of the incident particle and that typically has a time duration in the microsecond region. That is, the electrical pulse $V_{in}$ has an amplitude that represents the energy level for the radioactive particle that caused the interaction event. All $V_{in}$ pulses can be considered to be "essentially instantaneous" when analyzed in terms of millisecond or second time domains.

Still referring to FIG. 1, an amplified unipolar pulse from a preamplifier 13 passes into a band pass filter 14 including a low pass filter 15 and high pass filter 16. In one embodiment, this amplified unipolar pulse has a duration of about 3 microseconds and an amplitude of about 1 mV per 1 KeV of energy. The band pass filter 14 shapes the incoming signals to reject high and low frequency noise usually by being constructed to produce a Gaussian-shaped pulse or an output that represents the output of the filter with a triangular response for amplitude versus frequency. The band pass filter 14 produces filtered output pulses $V_f$. A comparator 17 receives the $V_f$ output pulses at its negative input and a dc bias signal from a dc bias source 20 at its positive input.

That portion of each $V_f$ pulse that has an amplitude greater than the dc bias passes to a low pass filter 21 as output voltage $V_O$. The $V_O$ signal represents the product of the energy of each pulse and the pulses per second. Thus, the output approximately measures the danger of radiation by calculating the product of pulse energy and the number of pulses/second. The inclusion of pulse energy is preferred because high energy particles do more damage to human body.

FIG. 1 and U.S. Pat. No. 2,968,726 disclose radiation detectors that provide appropriate results in "clean" or "low-noise" environments. However, certain new requirements for radiation detection do not have the luxury of operating in a low-noise environment. For example, there is now a threat of terrorist-sponsored attacks using radioactive substances. In the event any attack in which the dispersal of radioactive substances is possible, first responders must determine if a location is contaminated and if so, must determine the level of radioactivity accurately. In this application, the range of energy levels of interest is 50 KeV to 2 Mev.

As first responders or others approach the area of such an attack, they will encounter high levels of acoustic noise from fire sirens and air horns that emit high levels of acoustic broadband sound or noise. It has been found that prior art detection apparatus in the vicinity will respond to such sounds or noise as well as to interaction events. That is, the prior art detection apparatus will detect noise as if radiation were present when it is not. For example, detectors that use high voltages to bias the crystal can generate current in response to any mechanical motion of the detector following the capacitance equation $Q=dc*V$ where q is the resultant current in coulombs when a capacitance biased with V volts is displaced with the resultant capacitance change of dc. This acoustic energy is difficult to shield because sirens, for example, have acoustic energy reaching past 1 MHz. The amplitude requires approximately 60 db of acoustic isolation to protect the prior art detectors from such acoustic noise.

For enhanced personnel protection, such radiation detectors should be mounted on the exterior of a vehicle so that personnel remain in the vehicle until it is determined to be safe to exit the vehicle. However, an externally mounted detector is subject to being struck by stones and other road debris. Such impact events can cause even larger broadband noise pulses that may last for 5-10 mS. These noise pulses when generated are a problem because they are categorized as radiation pulses or interaction events. Thus prior art radiation detectors record both the signals generated by noise as well as signals induced by interaction events. Consequently the noise readings in such detectors can overstate the level of radiation that is present.

It will be necessary to detect low levels of radiation when approaching such a location. Prior art devices for detecting low levels of radioactivity can be expensive. The application of these radiation detectors to first responder vehicles and like applications will require large numbers of devices. The costs may be prohibitive.

Therefore what is needed is a radiation detector that can detect a wide range of radiation levels in a noisy environment, that is adapted for mounting to a vehicle and that is less expensive to manufacture than prior art radiation devices.

SUMMARY

Therefore it is an object of this invention to provide a radiation detector for use in an environment that is subject to acoustically and mechanically induced noise with only minimal impact on the accuracy of the radiation readings.

Another object of this invention to provide a radiation detector that is particularly adapted for use on first responder vehicles and similar applications for monitoring radiation in environments subject to acoustically and mechanically induced noise with only minimal impact on the accuracy of the radiation readings.

In accordance with one aspect of this invention, a radiation detector monitors an area for the presence of ionizing radiation by generating an essentially instantaneous interaction event pulse with an amplitude dependent upon energy level for each interaction event. These interaction pulses are converted into fixed amplitude, variable width pulses. The fixed amplitude, variable width pulses produce a signal proportional to the ionizing radiation rate and energy that is relatively unaffected by noise signals that produce interaction events.

In accordance with another aspect of this invention, a radiation detector monitors an area for the presence of ionizing radiation in an environment characterized by noise. A sensor generates an interaction event pulse having an amplitude that depends upon the energy level of each interaction event and wherein each interaction event can be generated in response to an interaction of radiation with said sensor or by noise. A pulse modification circuit connects to the sensor and converts a first interaction event pulse to a fixed amplitude output pulse having a width that depends upon the amplitude of the interaction event pulse whereby the receipt of additional interaction event pulses during the existence of an output pulse extends the width of said output pulse. A low-pass filter converts the output pulses into a signal representing the rem reading for the ionizing radiation.

In accordance with yet another aspect of this invention, radiation detection apparatus for monitoring an area for the presence of ionizing radiation and interfering noise includes the means for generating an interaction event pulse having an amplitude that depends upon the energy level of each interaction event wherein each interaction event pulse can be in response to the detection of ionizing radiation or the receipt of interference noise. A pulse modification circuit processes each interaction event pulse and includes a timer that establishes a time interval responsive to the receipt of a first interaction event pulse. Another circuit minimizes the effect of any interaction event pulse that occurs during the time interval. A signal processor converts the pulses processed in said pulse modification circuit into a signal providing an indication of dangerous levels of ionizing radiation.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF ILLUSTRATIVE EMBODIMENTS

Figure 1:
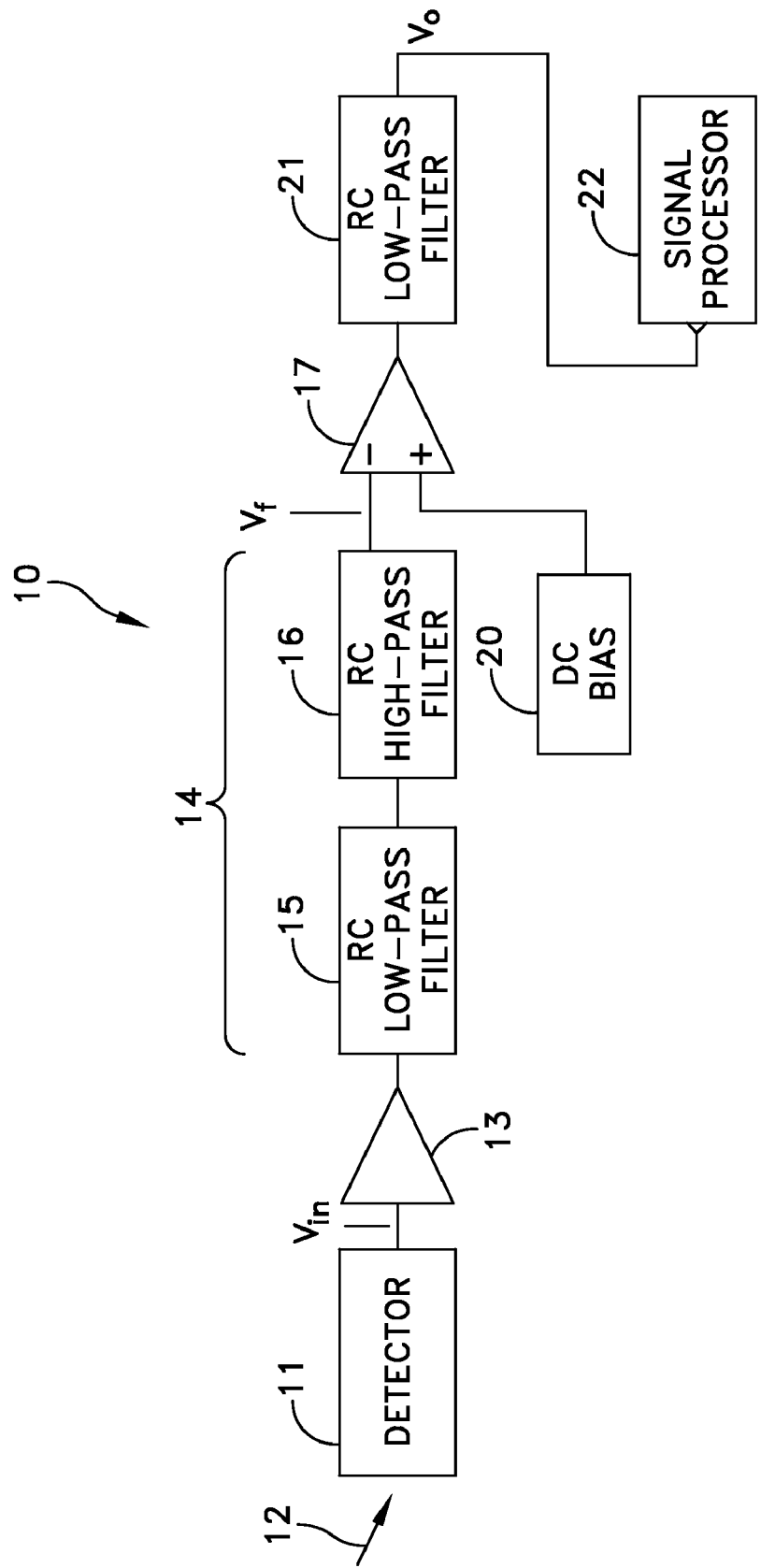
FIG. 1 is a block diagram of a prior art radiation detection apparatus.
Figure 2:
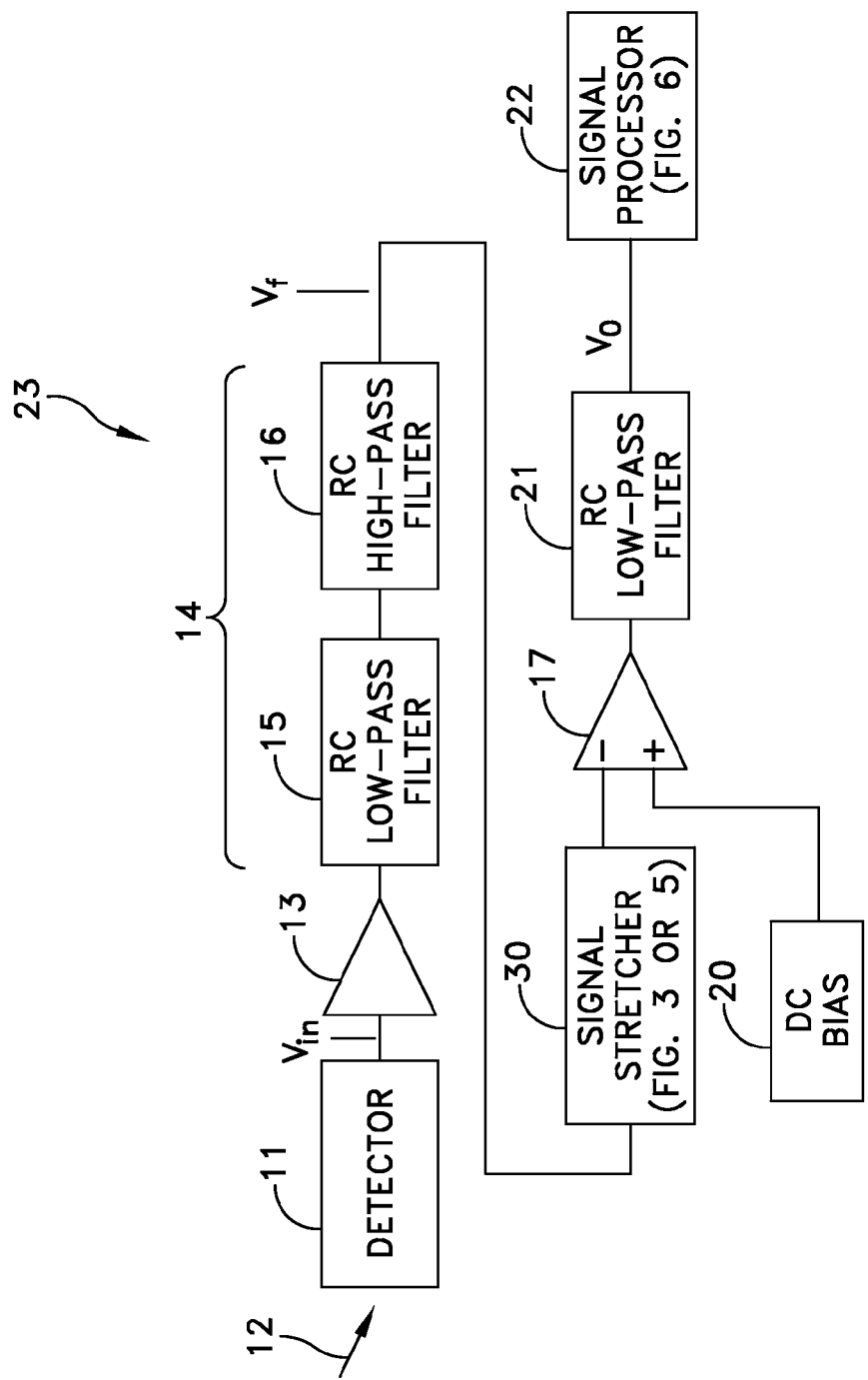
FIG. 2 is a block diagram of a radiation detection apparatus incorporating this invention.

FIG. 2 depicts a radiation detection apparatus 23 that incorporates this invention and is adapted for monitoring an environment or area for the presence of ionizing radiation wherein noise characterizes the environment or area. As components in this radiation detector apparatus 23 are functionally the same as those in FIG. 1, like reference numbers refer to like components. Thus in FIG. 2 a detector 11 generates an interaction event pulse $V_{in}$ in response to each interaction event whether that event is caused by the interaction of radiation with the detector 11 or by noise. As in FIG. 1, the detector 11 may have many forms. For example, the detector may comprise a scintillation material and photodiode that, as known in the art, convert the light generated by each interaction event and the scintillation crystal into an electrical pulse $V_{in}$. These scintillation materials include depleted-type 4 crystal materials such as cadmium telluride.

A pulse modification circuit receives all the interaction event pulses $V_{in}$. Specifically, a preamplifier 13 and a band pass filter 14, including a low pass filter 15 and high pass filter 16, produce filtered output signals $V_f$. These pulses also have an amplitude dependent upon the amplitude of the $V_{in}$ pulses and are also essentially instantaneous. For example, both the low-pass filter 15 and the high-pass filters may be selected with their respective 3 dB points at 500 kHz.

The pulse modification circuit also includes a pulse stretcher 30, specific examples being described later with respect to FIGS. 3 and 5. The pulse stretcher 30 converts each $V_f$ pulse into a fixed amplitude, variable width pulse wherein the pulse width is dependent upon the height the amplitude of the corresponding $V_f$ pulse. That is, in a noise-free environment, over a series of pulses, the radiation detector 23 produces a pulse train of fixed amplitude pulses that are width modulated by the energy level of each interaction event.

The pulse stretcher 30 energizes the negative input of the comparator 17, the dc bias circuit 20 establishing a threshold level at the positive input. The dc bias is set to correspond to signals representing certain minimum energy levels, such as a minimum energy level of 50 Kev. Pulses below this energy range typically result from noise or radiation energy levels that can be ignored. Thus these pulses do not affect the output signal $V_o$.

The resulting output signal $V_o$ from low pass filter 21 drives the signal processor 22 that can constitute any of a variety of annunciators that, when activated, preferably produce a combination of audio and flashing light to alert personnel that radiation is approaching a dangerous level so that the personnel can retreat or take other appropriate action. That is, the low pass filter 21 converts the fixed height, variable width output pulses into a signal proportional to the ionizing radiation rate and energy level.

Figure 3:
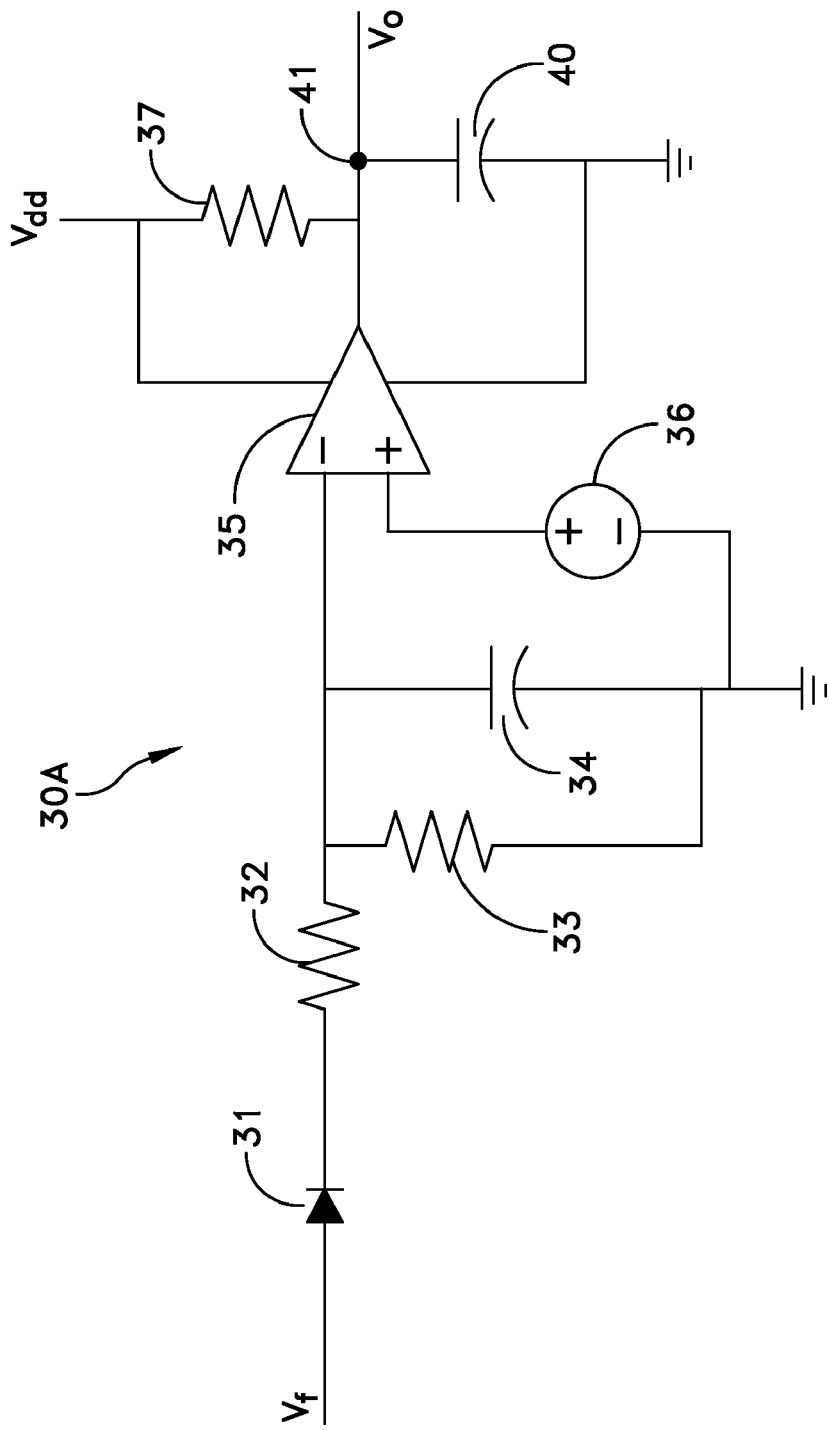
FIG. 3 is one embodiment of a pulse stretcher as shown in FIG. 2.

FIG. 3 depicts one specific embodiment 30A of the pulse stretcher 30 in FIG. 2. In FIG. 3 each fixed width, variable amplitude pulse $V_f$ from the bandpass filter passes through a diode 31 and a resistor 32 into an RC network including a resistor 33 and capacitor 34. The time constant for the resistor 32 and capacitor 34 is short in comparison with the time constant established between the resistor 33 and the capacitor 34.

The voltage on the capacitor 34 is applied to the negative input of a comparator 35. A dc bias source 36 energizes the positive input with a constant biasing voltage. Although shown schematically, the source 36 typically will comprise a voltage divider. For energy ranges of 50 KeV to 2 MeV, the preamplifier 13 produces amplified unipolar pulses between 50 mV and 2 V. The biasing voltage would be set to 50 mV to eliminate readings of lower energy pulses. The are of no interest in evaluating harmful radiation.

A power supply, not shown but known to those skilled in the art, supplies a voltage $V_{dd}$ to the comparator 35 and an output circuit comprising a resistor 37 and capacitor 40. The output voltage $V_o$ appears at a junction 41 of the output of the comparator 35, the resistor 37 and the capacitor 40.

As may now be apparent, each positive-going $V_f$ pulse passes through the diode 31 and resistor 32 to charge the capacitor 34. When the pulse $V_f$ terminates, the capacitor 34 discharges through the resistor 33 at a slower rate thereby establishing a time interval responsive to the receipt of a first interaction event pulse. During this time, the output of $V_o$ remains at ground. This is shown in FIG. 4 wherein the output $V_o$ drops to essentially zero upon receipt of the fixed width variable amplitude pulse 42.

Figure 4:
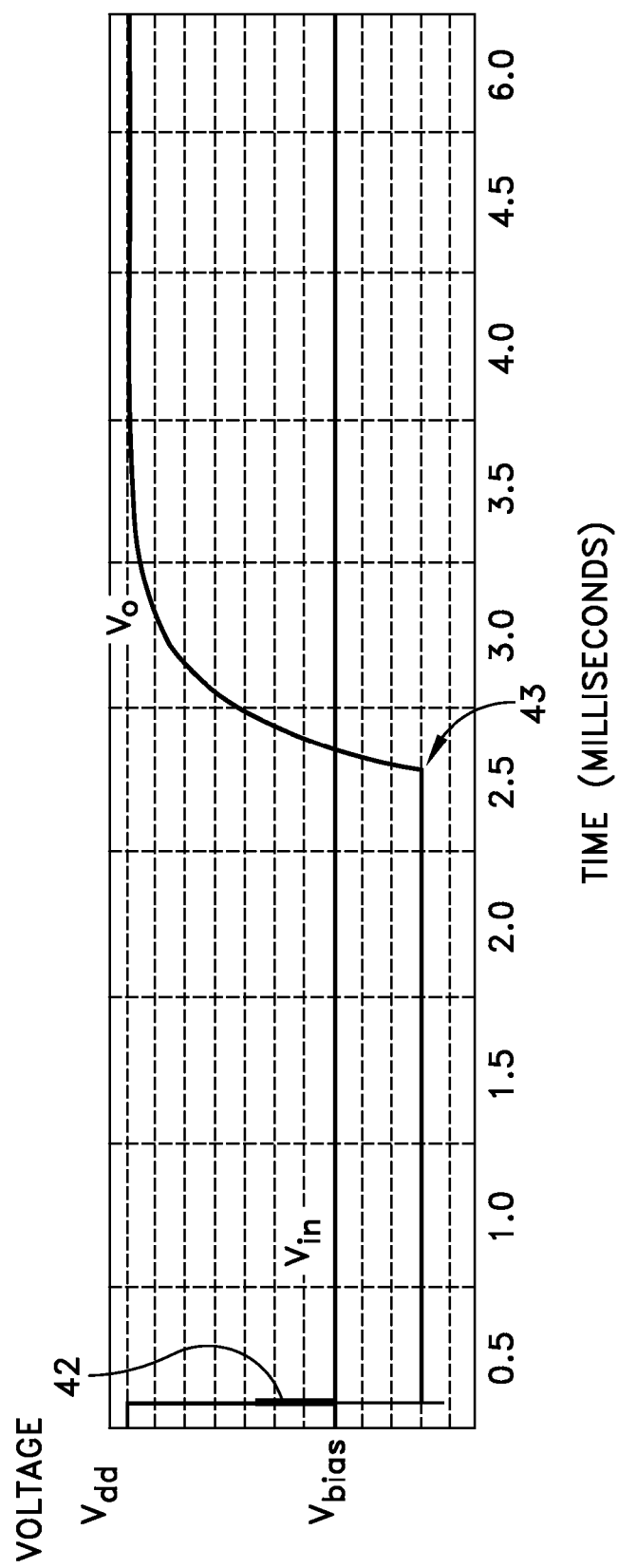
FIG. 4 is a graph that is useful in understanding the operation of the pulse stretcher of FIG. 3.

Upon discharge of the capacitor 34 to the voltage established by the dc bias 36, $V_o$ begins a return to the supply voltage $V_{dd}$ beginning at point 43 in FIG. 4 according to the time constant established by the resistor 37 and capacitor 40 and any other circuitry at the junction 41 in FIG. 3. As can be seen from FIG. 4, the $V_{in}$ pulse 41, which has a width corresponding to a few microseconds expands to a pulse having a width in the millisecond time range, an increase of between two and three orders of magnitude. Further, it will be apparent the width of each output pulse, such as the width of pulse 42 to the point 43 in FIG. 4, varies linearly according to the amplitude of the $V_f$ pulse that charges the capacitor 34.

In FIG. 4 the signal $V_{in}$ is at a base line that is greater than zero, specifically at a value $V_{bias}$. As previously indicated, this bias is helpful in eliminating noise. However, it does have the potential of effectively reducing the energy level of any pulse $V_f$. The resistor 37 and capacitor 40 compensate because they essentially extend all the $V_o$ pulses by an offsetting amount.

The foregoing description has described the operation of the radiation detection apparatus 23 without considering the effects of noise. As previously indicated, noise does not generally appear as a single pulse. Rather it appears as a train of high frequency pulses. In the time interval to point 43 in FIG. 4, a single noise event may produce tens or hundreds of $V_f$ pulses that are essentially indistinguishable from those produced by radiation. However, as will be apparent, while the pulses may extend with the time to point 43, only one pulse is recorded thereby minimizing the effect of any interaction event pulse that occurs during the time interval to point 43. As the output signal $V_o$ represents the product of (1) the energy of the pulses and (2) the number of pulses, the output signal $V_o$ is made more accurate by the inclusion of the pulse stretcher circuit 30A.

For example, assume that the radiation being monitored has an energy level of 100 KEV and the interaction events occur at one per second. In a noise-free environment $V_o$ then represents a value of 100 KEV/second. Now assume that after an interaction event, noise produces 10 pulses with an energy of 60 KEV within the time interval of the $V_o$ pulse. Without this invention, $V_o$ would represent 700 KEV/second, the sum of the 100 KEV per second attributed to the radiation event and 600 KEV per second being attributed to the noise. In accordance with this invention, however, assume that the 10 pulses occur during the generation of the variable width pulse by the radiation event. Only one pulse is recorded. The pulse width, however, increases from 100 KEV to approximately 160 KEV. As a result the $V_o$ represents 160 KEV/second. This represents a 20 DB noise reduction. In many cases the noise improvement has been found to be even greater.

As will be apparent to those skilled in the art, the circuit in FIG. 3 reduces the charging voltage for the capacitor 34 by the forward voltage drop across the diode junction. If the diode voltage drop were constant, the dc bias voltage could compensate this reduction. However, the voltage drop is also temperature dependent and not readily compensated by controlling the bias voltage. FIG. 5 depicts a circuit variation which, when required, can eliminate this drop. Basically, a pulse stretcher circuit 30B contains the same basic circuits as shown in FIG. 2 and like reference numerals define like elements. In this embodiment, however, the $V_f$ pulses are fed to an ideal diode circuit 45 that includes the diode 31 and an intermediate operational amplifier 46. Specifically, the $V_f$ pulses are applied to the positive input of the operational amplifier 46. The resulting output from the operation amplifier 46 feeds back through the diode 31 to the negative input of the operational amplifier 46. Consequently the amplitude of the pulse charging the capacitor 34 equals to the amplitude of the $V_f$ signal.

Figure 6:
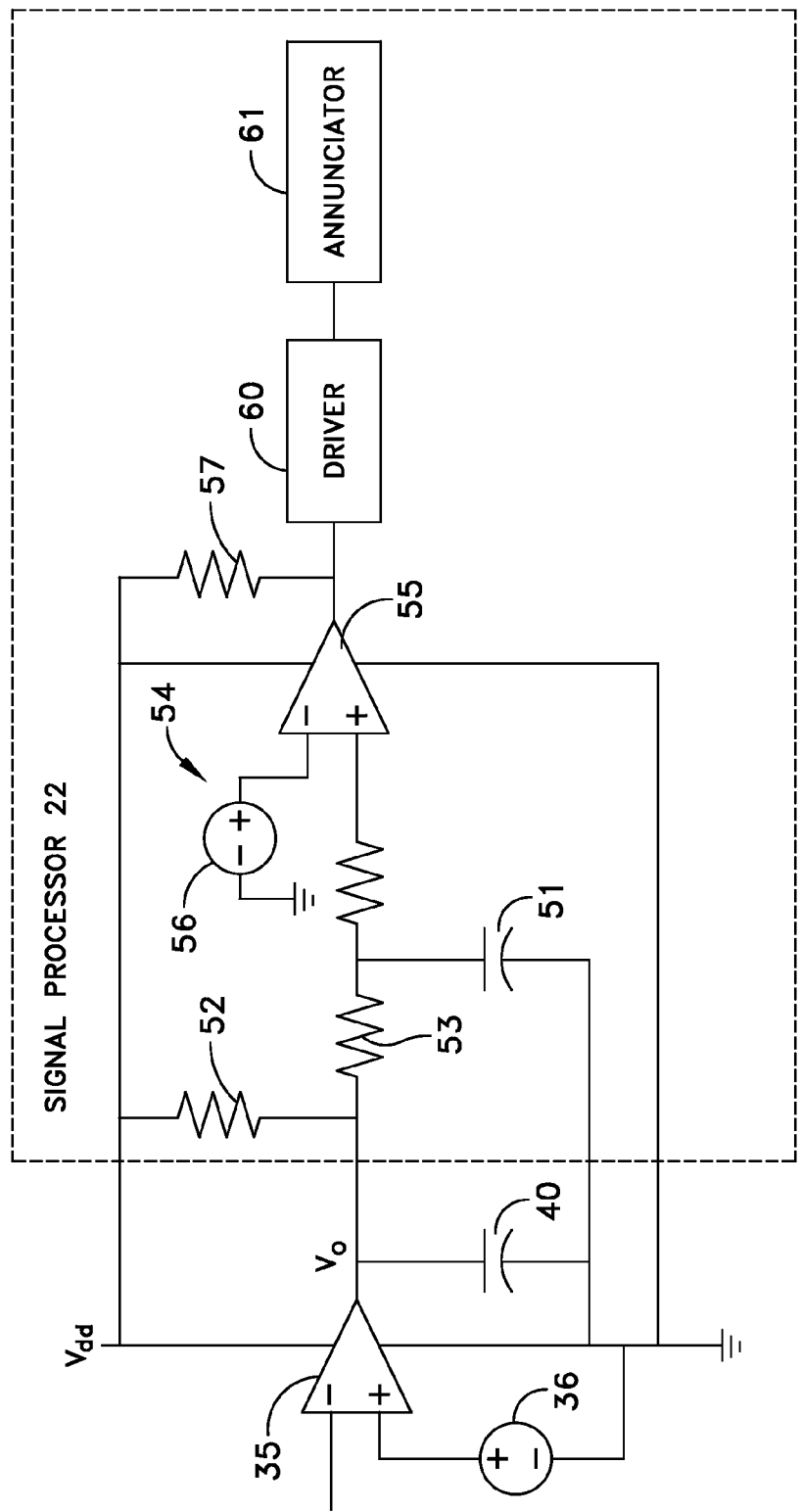
FIG. 6 depicts additional details of a signal processor adapted for use with the radiation detector shown in FIG. 2.

FIG. 6 depicts a portion of either of the pulse stretching circuits 30A or 30B connected to annunciate abnormally high radiation levels by audio and/or visual means. The output pulse $V_o$ is normally high and charges a capacitor 51 through a resistor 52 and a resistor 53 to the supply voltage $V_{dd}$. A comparator circuit 54 includes comparator 55 and a bias source 56. A resistor 57 at the output of the comparator 55 pulls up the input of a driver 60 to the supply voltage thereby disabling an annunciator 61. The drive 60 and annunciator 61 can take any of the many forms known to persons of ordinary skill in the art.

When the extended $V_o$ pulse goes low, the capacitor 51 discharges through the resistor 53. When the voltage across the capacitor 51 drops below the bias voltage, the comparator 55 shifts its output to a low value enabling the driver 60 to initiate the annunication.

In this specific embodiment, the resistor 52 has a value that is many times the value of the resistor 53. Thus the time constant for charging the capacitor 51 when the voltage $V_o$ goes high is long in comparison with the time for discharging the capacitor 51. For example in one embodiment the time constant for the resistors 52 and 53 is 22 seconds while the time constant for the capacitor 51 and resistor 53 is in the order of 50 milliseconds.

At low radiation levels, the discharge of the capacitor 52 in response to each output pulse is only a portion of the total charge on the capacitor 51. Consequently the output of the comparator 54 remains high. However, as the radiation levels increase, the discharge in response to each output pulse increase. Eventually at some output pulse rate, successive discharge operations cause the voltage on capacitor 51 to drop below the value supplied by the bias source 56. The comparator 54 thereupon shifts its output to a low value. When this occurs, the driver 60 enables the annunciator 61 to make its visual or/and audio alarm.

Figure 5:
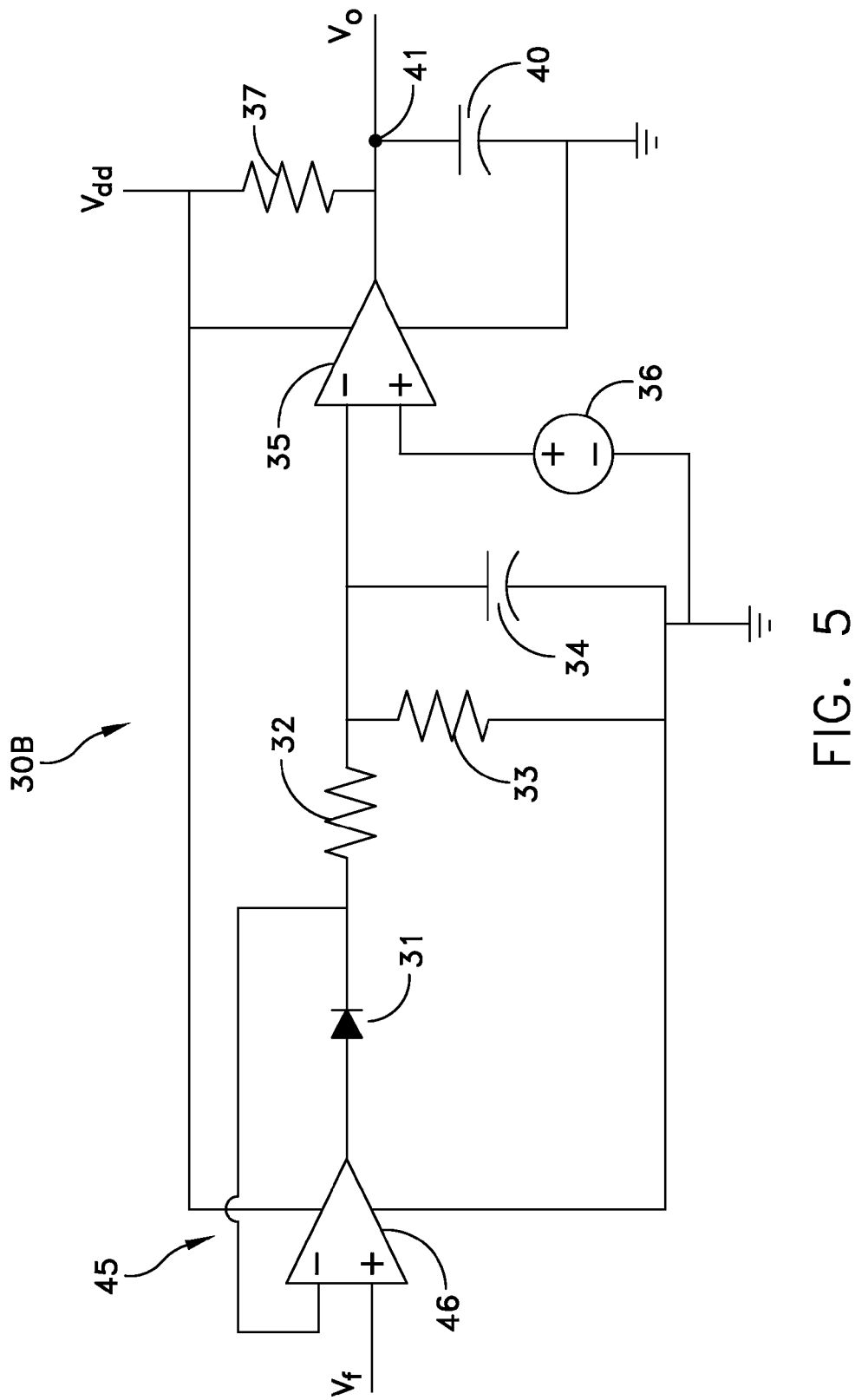
FIG. 5 is another embodiment of a pulse stretcher useful in the circuit of FIG. 2.

Each of the embodiments particularly shown in FIGS. 3, 5 and 6 can be constructed using a number of different components. The following Component Table identifies certain values that have been shown to provide results in accordance with this invention:

COMPONENT TABLE

| COMPONENT | FIG. 3 | FIG. 5 | FIG. 6 |
|---|---|---|---|
| CR31 | 1N4148 | 1N4148 | FLLD261 |
| R32 | 22 Ω | 22 Ω | 22 Ω |
| R33 | 1 MΩ | 1 MΩ | 3.3 MΩ |
| C34 | 0.005 µF | 0.005 µF | 0.005 µF |
| OA35 | TLC372 | TLC372 | TLC372 |
| R37 | 470 kΩ | 470 kΩ | |
| C40 | 470 pF | 470 pF | 0.005 µF |
| OA46 | | 725 | 725 |
| R51 | | | 1 MΩ |
| C52 | | | 22 µF |
| R53 | | | 2 kΩ |
| OA55 | | | TLC372 |
| R57 | | | 20 kΩ |

From the foregoing it will be apparent that a radiation detection apparatus constructed in accordance with this invention meets all the objectives of this invention. Specifically, the apparatus is relatively insensitive to noise and provides more accurate indications of radiation dose in rem than has been available in prior radiation detection apparatus. This apparatus is easy to implement and use and inexpensive to manufacture. It can be mounted exteriorly of a vehicle to warn the occupants of radiation dangers while the individuals remain within the vehicle that provides some modicum of protection.

Figure 7:
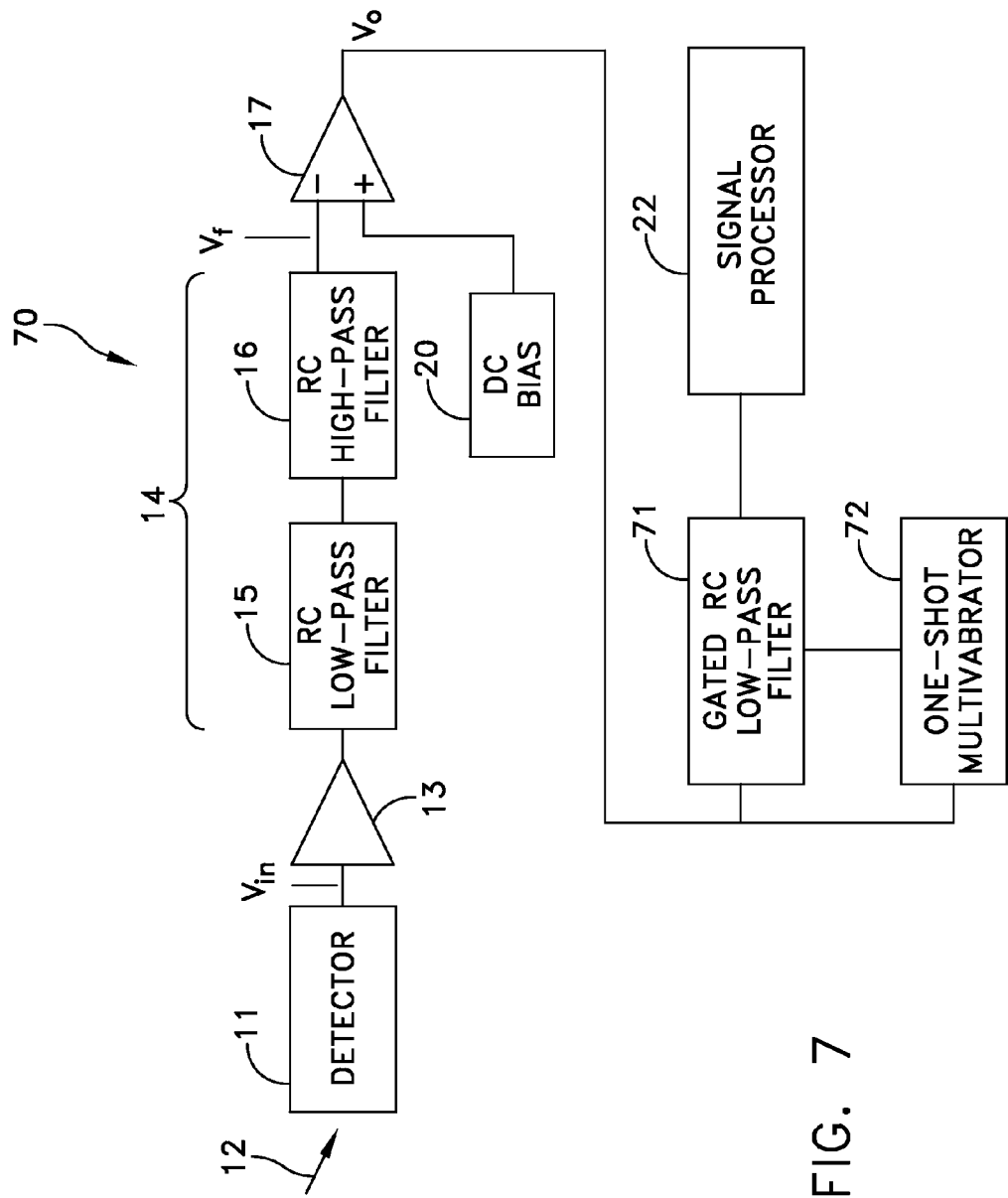
FIG. 7 is a block diagram of an alternative embodiment of a radiation detection apparatus incorporating this invention.

FIG. 7 depicts an alternate embodiment of radiation detection apparatus 70 that incorporates many of the components described with respect to FIG. 2. Like reference numerals refer to those components. That is, the radiation detection apparatus 70 includes a detector 11 for receiving ionizing radiation. In a noisy environment, the detector 11 generates $V_{in}$ interaction event pulses that may be the result of ionizing radiation or noise. A band pass filter 14 shapes each pulse. A comparator generates a $V_f$ pulse each time the amplified and shaped pulse from the RC high-pass filter 16 exceeds the threshold set by the dc bias circuit 20.

In FIG. 7, the $V_o$ pulses from the comparator 17 are applied in parallel to a gated RC low-pass filter 71 and one-shot multivibrator 72. Assuming that the one-shot multivibrator 72 is reset, a $V_f$ pulse is gated into the RC low-pass filter 71. However, this $V_f$ pulse causes the one-shot multivibrator to shift to its active state and disable further inputs to the RC low-pass filter 71 for the duration of the active state. That is, the one-shot multivibrator 72 constitutes a timer for establishing a time interval in response to the receipt of a first $V_f$ pulse. When this occurs, the gating circuitry in the gated RC low-pass filter 71 precludes the processing of successive $V_f$ pulses in the RC low-pass filter 71. Only the energy of the first $V_f$ pulse contributes to the output from the RC low-pass filter 71. The effect of any interaction event pulse that occurs during the time interval is minimized.

The disclosure of this invention has been limited to certain specific embodiments, it will be apparent to those skilled in the art that a number of variations can be made in terms of component selection while still achieving the objectives of this invention. For example, the operation of the one-shot multivibrator in FIG. 7 could be implemented in software within the signal processor. Other variations have been described in the foregoing description. Therefore, it is the intent of the appended claims to cover all such variations and modifications as come within the true spirit and scope of this invention.

What is claimed as new and desired to be secured by Letters Patent of the United States is:

1. Radiation detection apparatus for monitoring an area for the presence of ionizing radiation comprising:
   A) pulse generating means for generating an interaction event pulse having a characteristic width and an amplitude that depends upon the energy level of each interaction event,
   B) pulse modification means connected to said pulse generating means for converting each interaction event pulse into an output pulse having a fixed amplitude and a width that depends upon the amplitude of the interaction event pulse and that exceeds the characteristic interaction event pulse width by at least one order of magnitude, and
   C) conversion means for converting the output pulses from said pulse modification means into a signal proportional to the ionizing radiation rate and energy level.

2. Radiation detection apparatus as recited in claim 1 additionally comprising signal processing means connected to said conversion means for providing an indication of dangerous levels of ionizing radiation.

3. Radiation detection apparatus as recited in claim 1 wherein said pulse modification means includes:
   i) a comparator having first and second inputs and an output,
   ii) charge storage means connected to said radiation detector means and said first comparator input for being charged by each interaction event pulse and having discharge means for enabling the discharge of said charge storage means in the absence of an interaction event signal.

4. Radiation detection apparatus as recited in claim 3 wherein said charge storage means includes:
   a) a capacitor connected to said first comparator input,
   b) a first resistor connected to said capacitor and said first comparator input to receive each interaction event pulse, and
   c) a second resistor in parallel with said capacitor to discharge said capacitor, said second resistor having a value that is large in comparison with the value of said first resistor whereby the RC time constant during the existence of an interaction event pulse is short in comparison with the RC time constant for discharging the capacitor and whereby the pulse width at said comparator output varies linearly with the amplitude of interaction event pulses.

5. Radiation detection apparatus as recited in claim 4 wherein said pulse modification means additionally includes unidirectional conduction means for enabling the transfer of interaction event pulses to said charge storage means.

6. Radiation detection apparatus as recited in claim 5 wherein said unidirectional conduction means comprises a diode.

7. Radiation detection apparatus as cited in claim 5 wherein said unidirectional conduction means includes a feedback amplifier for receiving the interaction event pulses and a diode having an anode connected to the output of said feedback amplifier means and having a cathode connected to said charge storage means and to the input of said feedback amplifier means thereby to overcome any voltage drop through said diode.

8. Radiation detection apparatus as recited in claim 5 wherein said pulse generating means includes a detector for interacting with radiation to produce an electrical pulse and said pulse modification means includes preamplifier means for amplifying each interaction event pulse and band pass filter means for shaping each amplified interaction event pulse, the output of said band pass filter means being coupled to said unidirectional conducting means.

9. Radiation detection apparatus as recited in claim 4 wherein said conversion means includes a low pass filter for generating a signal that corresponds to the product of the energy level for each pulse and the total number of pulses over a time interval thereby to generate a radiation reading in rems.

10. Radiation detection apparatus for monitoring an area for the presence of ionizing radiation wherein said radiation detector is to be operated in an environment characterized by noise, said radiation detector comprising:
  A) a detector that generates an interaction event pulse having a characteristic width and an amplitude that depends upon the energy level of each interaction event and wherein each interaction event can be generated in response to an interaction of radiation with said detector or by noise,
  B) a pulse modification circuit connected to said detector that converts an interaction event pulse into an output pulse having a fixed amplitude and having a width that depends upon the amplitude of the interaction event pulse and that exceeds the characteristic interaction event pulse width by at least one order of magnitude whereby the receipt of additional interaction event pulses during the existence of an output pulse extends the width of said output pulse, and
  C) a low-pass filter that converts the output pulses into a signal representing the rem reading for the ionizing radiation.

11. Radiation detection apparatus as recited in claim 10 wherein said pulse modification circuit includes:
  i) a comparator having first and second inputs and an output,
  ii) charge storage means connected to said radiation detector means and said first comparator input for being charged by each interaction event pulse and having discharge means for enabling the discharge of said charge storage means in the absence of an interaction event signal,
  iii) a capacitor connected to said first comparator input,
  iv) a first resistor connected to said capacitor and said first comparator input to receive each interaction event pulse, and
  v) a second resistor in parallel with said capacitor to discharge said capacitor, said second resistor having a value that is large in comparison with the value of said first resistor whereby the RC time constant during the existence of an interaction event pulse is short in comparison with the RC time constant for discharging the capacitor and whereby the pulse width at said comparator output varies linearly with the amplitude of the interaction event pulse.

12. Radiation detection apparatus as recited in claim 11 wherein said pulse modification circuit additionally includes unidirectional conduction means for enabling the transfer of interaction event pulses to said capacitor.

13. Radiation detection apparatus as recited in claim 12 wherein said unidirectional conduction means comprises a diode with an anode connected to said sensor and a cathode connected to said capacitor.

14. Radiation detection apparatus as cited in claim 12 wherein said unidirectional conduction means includes a feedback amplifier for receiving the interaction event pulses and a diode having an anode connected to the output of said feedback amplifier means and a cathode connected to said capacitor and to the input of said feedback amplifier means thereby to overcome any voltage drop through said diode.

15. Radiation detection apparatus as recited in claim 12 wherein said sensor includes a detector for interacting with radiation to produce an electrical pulse and said pulse modification circuit includes a preamplifier that amplifies each interaction event pulse and a band pass filter that shapes the amplified interaction event pulse, the output of said band pass filter being coupled to said unidirectional conducting means.

16. Radiation detection apparatus as recited in claim 10 additionally comprising a signal processor including an annunciator connected to said low-pass filter that provides an indication of dangerous levels of ionizing radiation in a form taken from the group of audio and visual indications.

17. Radiation detection apparatus as recited in claim 16 wherein said signal processor includes a comparator having first and second inputs, a capacitor coupled through first and second resistors to a reference voltage and to said first comparator input, a bias generator connected to said second comparator input, whereby output pulses charge the capacitor through said second resistor and said first resistor has a value that provides a long discharge time constant in comparison with the charging time constant.

18. Radiation detection apparatus for monitoring an area for the presence of ionizing radiation and interfering noise, said apparatus comprising:
  A) pulse generating means for generating an interaction event pulse having a characteristic width and an amplitude that depends upon the energy level of each interaction event wherein each interaction event pulse can be in response to the detection of ionizing radiation or the receipt of interference noise,
  B) pulse modification means connected to said pulse generating means for processing each interaction event pulse including:
    i) timing means for establishing, in response to the receipt of a first interaction event pulse, a time interval that is at least one order of magnitude greater than the event pulse characteristic width, and
    ii) means for minimizing the effect of any interaction event pulse that occurs during the time interval, and
  C) signal processing means for converting the pulses processed in said pulse modification means into a signal providing an indication of dangerous levels of ionizing radiation.

19. Radiation detection apparatus as recited in claim 18 wherein said timing means and said minimizing means convert each interaction event pulse that initiates said timing means into to a fixed amplitude output pulse having a width that depends upon the amplitude of the interaction event pulse.

20. Radiation detection apparatus as recited in claim 18 wherein said timing means establishes a time interval on receipt of an interaction pulse and said minimizing means thereafter precludes the processing of subsequent interaction event pulses received during the time interval.

* * * * *